United States Patent
Ao et al.

(10) Patent No.: US 6,658,937 B2
(45) Date of Patent: Dec. 9, 2003

(54) OSCILLATORY ANGULAR RATE SENSOR

(75) Inventors: Kenichi Ao, Tokai (JP); Hirofumi Higuchi, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/192,526

(22) Filed: Jul. 11, 2002

(65) Prior Publication Data

US 2003/0010121 A1 Jan. 16, 2003

(30) Foreign Application Priority Data

Jul. 12, 2001 (JP) .................................... 2001-212426

(51) Int. Cl.[7] .............................................. G01P 21/00
(52) U.S. Cl. ................................. 73/504.14; 73/504.12
(58) Field of Search ......................... 73/504.12, 504.13, 73/504.14, 504.15, 504.16, 504.02, 504.04

(56) References Cited

U.S. PATENT DOCUMENTS 4,791,815 A * 12/1988 Yamaguchi et al. ..... 73/504.16
5,686,711 A 11/1997 Yamamoto
6,516,651 B1 * 2/2003 Geen ........................... 73/1.16

FOREIGN PATENT DOCUMENTS

| JP | 5-283713 | 10/1993 |
|---|---|---|
| JP | 5-312576 | 11/1993 |
| JP | 8-297139 | 11/1996 |
| JP | 2000-28365 | 1/2000 |

* cited by examiner

*Primary Examiner*—Helen Kwok
(74) *Attorney, Agent, or Firm*—Posz & Bethards, PLC

(57) ABSTRACT

An oscillatory angular rate sensor unit includes a mount base and a sensor element installed on the mount base. The sensor element includes an oscillator which produces angular velocity-caused oscillations in a first direction when the sensor element experiences angular motion during self-excited oscillation of the oscillator in a second direction opposite the first direction. A resonant frequency of the sensor unit in the first direction is set to a value less than or equal to a reciprocal of square root of two times a difference between resonant frequencies of the oscillator in the first and second directions, thereby eliminating an error output caused by undesirable acceleration acting on the sensor unit.

2 Claims, 4 Drawing Sheets

OSCILLATORY ANGULAR RATE SENSOR

BACKGROUND OF THE INVENTION

1. Technical Field of the Invention

The present invention relates generally to an oscillatory angular rate sensor, and more particularly to an improved structure of such an angular rate sensor designed to minimize an output error.

2. Background Art

Typical oscillatory angular rate sensors have a sensor element equipped with an oscillator. The sensor element includes a substrate on which the oscillator is installed, an oscillation exciting mechanism, and an angular velocity sensing mechanism. The oscillator is supported by beams so that it may move elastically in a first direction and second direction oriented perpendicular to each other and in parallel to the substrate. The oscillation exciting mechanism excites the oscillator to oscillate in the first direction. The angular velocity sensing mechanism works to sense oscillatory movement of the oscillator in the second direction arising from angular motion of the sensor to determine the angular velocity of the sensor.

When the whole of the sensor experiences angular motion about an axis (will be referred to as an angular velocity sensing axis below) extending in a third direction perpendicular to the substrate during oscillation of the oscillator in the first direction parallel to the substrate, it will cause the Coriolis force to be produced which oscillates the oscillator in the second direction perpendicular to the first direction. The angular velocity sensing mechanism senses the degree of such an oscillation to determine the angular velocity the sensor is undergoing.

For example, Japanese Patent First Publication Nos. 2000-28365 and 5-312576 disclose angular rate sensors of the above type.

The above described angular rate sensor is so designed as to allow the oscillator to also oscillate in the second direction when the acceleration is applied externally to the sensor in the second direction. The angular velocity sensing mechanism also detects such an oscillation as being caused by the angular motion of the sensor around the angular velocity sensing axis. Specifically, the angular velocity sensing mechanism detects oscillatory movement of the oscillator in error for determining the angular velocity of the sensor when the sensor is not being rotated about the angular velocity sensing axis, but undergoing the acceleration in the second direction.

Conventional angular rate sensors usually have the sensing element installed on a mount base. Use of a rubber plate is proposed which is interposed between the sensor element and the substrate in order to absorb undesirable oscillation of the oscillator arising from application of acceleration. This measure is, however, still insufficient to eliminate the above error in determining the angular velocity of the sensor.

SUMMARY OF THE INVENTION

It is therefore a principal object of the invention to avoid the disadvantages of the prior art.

It is another object of the invention to provide an oscillatory angular rate sensor designed to minimize an output error caused by application of an undesirable acceleration force to the sensor.

According to one aspect of the invention, there is provided an angular rate sensor unit which comprises: (a) a mount base; and (b) a sensor element installed on the mount base. The sensor element includes generally a substrate, an oscillator, an oscillation exciting mechanism, and an angular velocity sensing mechanism. The oscillator is retained by the substrate through a first support member elastically deformable in a first direction and a second support member elastically deformable in a second direction perpendicular to the first direction. The oscillation exciting mechanism works to excite the oscillator to oscillate in the first direction. The angular velocity sensing mechanism works to produce a sensor output as a function of degree of oscillation of the oscillator in the second direction arising from angular motion the oscillator experiences about an axis extending in a third direction perpendicular to the first and second directions during oscillation of the oscillator in the first direction. A resonant frequency of a structure made up of the mount base and the sensor element in the second direction is set to a value less than or equal to a reciprocal of square root of two times a difference between a resonant frequency of the oscillator in the first direction and a resonant frequency of the oscillator in the second direction.

If the sensor unit experiences an acceleration of a frequency which is identical with the difference $\Delta f$ between the resonance frequencies of the oscillator in the first and second directions, it will result in an increase in degree of oscillation of the oscillator, which is added as a noise to a sensor output. In order to alleviate this problem, the resonant frequency of the structure made up of the mount base and the sensor element in the second direction is set lower than or equal to $\frac{1}{2}\frac{1}{2} \times \Delta f$, thereby damping the undesirable oscillation of the structure in the second direction greatly.

In the preferred mode of the invention, the resonant frequency of the structure in the second direction is higher than or equal to a cut-off frequency in angular motion response of the sensor element. Generally, a sensor unit of the type, as discussed herein, is required not to resonate when the sensor unit is rotated at a lower speed, that is, when the angular velocity is lower than a given frequency (i.e., the cut-off frequency). The resonance frequency of the structure in the second direction is, therefore, set higher than the cut-off frequency, thereby achieving desired response of the sensor unit to angular motion.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
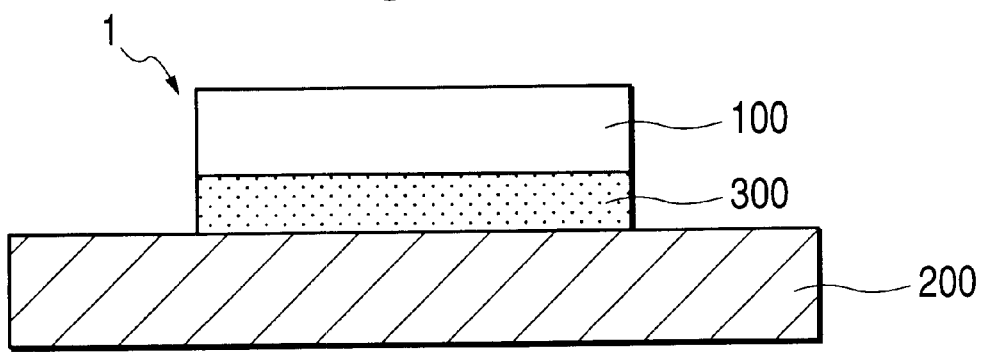
FIG. 1 is a transverse sectional view which shows an angular rate sensor unit according to the invention.

Referring to the drawings, wherein like reference numbers refer to like parts in several views, particularly to FIG. 1, there is shown an angular rate sensor unit 1 according to the invention which consists essentially of an angular rate sensor chip (i.e., a sensor element) 100, a ceramic mount base 200, and an adhesive layer 300 which joins the angular rate sensor chip 100 on the mount base 200. The mount base 200 is a bottom of a package within which the sensor chip 100 is installed and made of, for example, a silicone-based resin. The whole of the package is omitted in the drawing for the simplicity of illustration.

Figure 2:
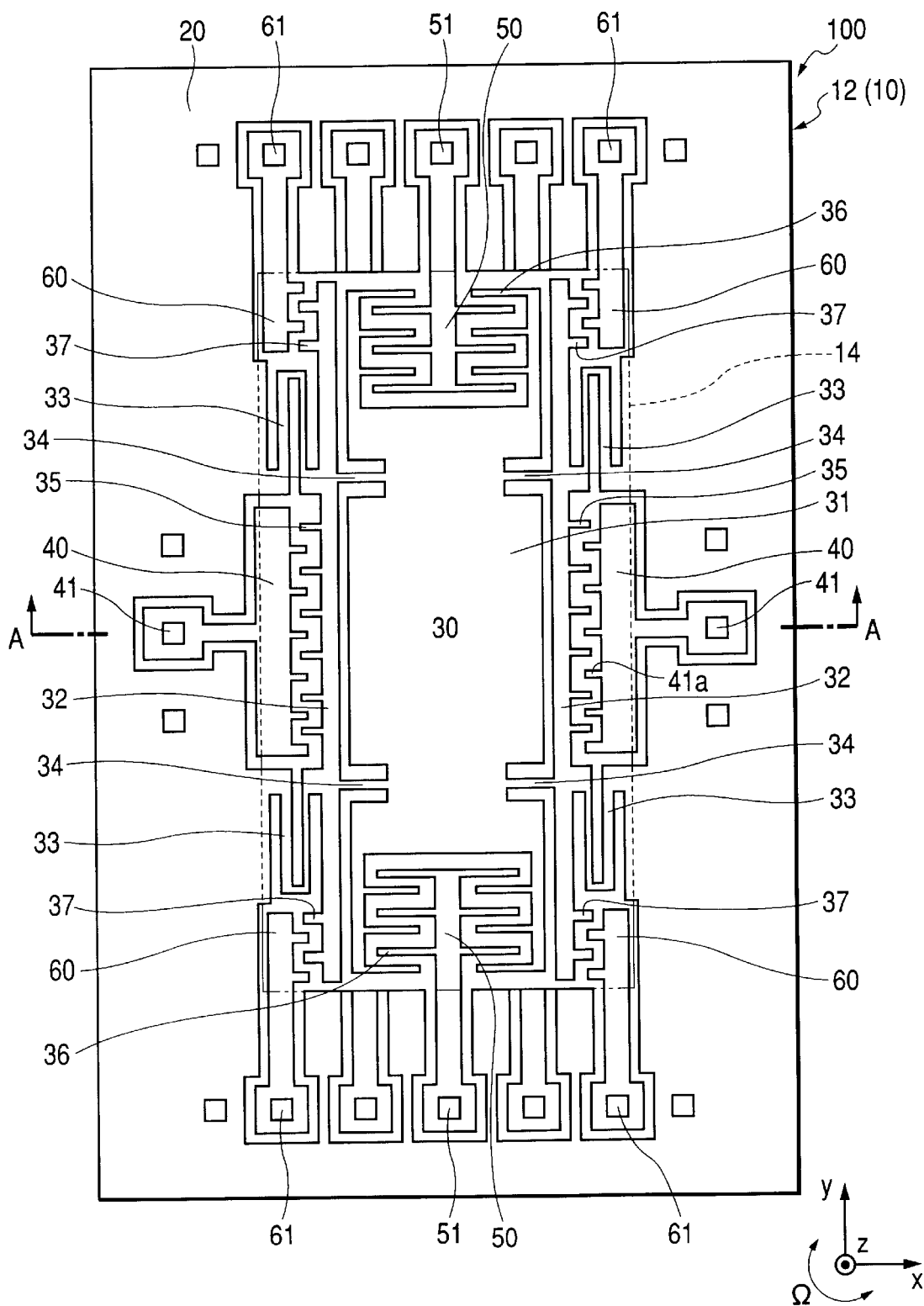
FIG. 2 is a plan view which shows a sensor element of the angular rate sensor unit of FIG. 1.
Figure 3:
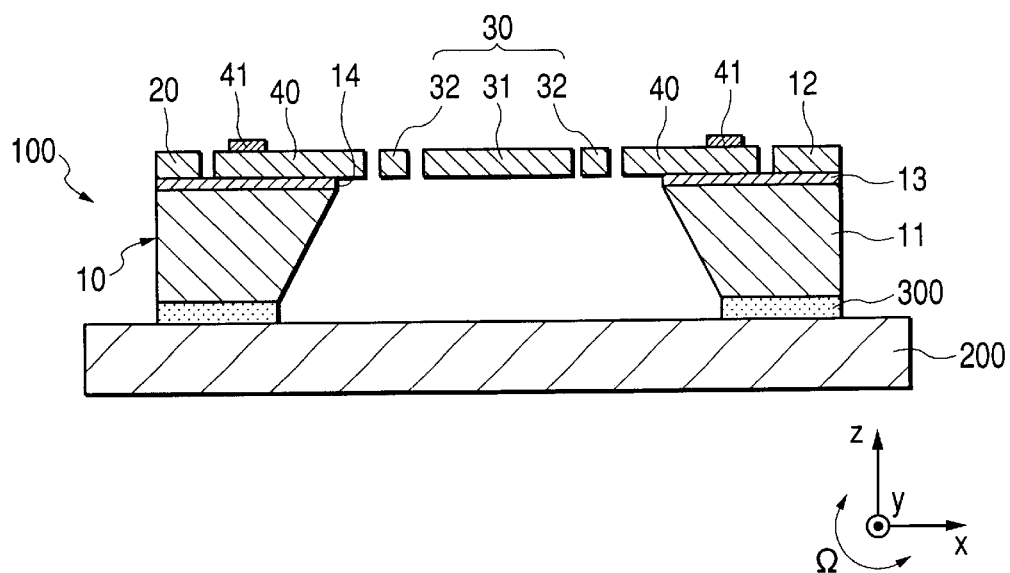
FIG. 3 is a transverse sectional view taken along the line A—A in FIG. 2.

The sensor chip 100 is made by micromachining a semiconductor substrate and, as shown in FIGS. 2 and 3, includes a rectangular SOI (silicon-on-insulator) substrate 10. The SOI substrate 10 is, as clearly shown in FIG. 3, made of a lamination of a first silicon substrate 11, a second silicon substrate 12, and an oxide film 13 working as an insulator.

The second silicon substrate 12 has grooves formed by etching to define a frame-like base portion 20 on the periphery thereof and a movable mass portion 30 inside the base portion 20.

The first silicon substrate 11 and the oxide film 13 have, as clearly shown in FIG. 3, a rectangular opening 14 formed in portions thereof opposed to the mass portion 30 of the second silicon substrate 12. The base portion 20 of the second silicon substrate 12 is borne on a peripheral portion of the first silicon substrate 11 through the oxide film 13. The SOI substrate 10 is affixed at the fist silicon substrate 11 to the mount base 200 through the adhesive layer 300.

The mass portion 30 includes a substantially rectangular oscillator 31 formed on a central portion of the second silicon substrate 12 and movable strips 32 formed outside the oscillator 31 at a given interval away from each other in a width-wise direction of the substrate 10 (will be referred to as an x-axis direction below). Each of movable strips 32 is connected to the base portion 20 through a C-shaped drive beam 33. The oscillator 31 is connected to the movable strips 32 through sensor beams 34.

Each of the C-shaped drive beams 33 is so shaped as to be deformed elastically only in the x-axis direction, thereby allowing the whole of the mass portion 30 including oscillator 31 to oscillate in the x-axis direction. Each of the sensor beams 34 is so shaped as to be deformed elastically only in a direction perpendicular to the x-axis direction (will be referred to as a y-axis direction below), thereby allowing only the oscillator 31 of the mass portion 30 to oscillate in the y-axis direction.

Specifically, the oscillator 31 is supported by the substrate 10 through the movable strips 32. The movable strips 32 are joined to the substrate 10 through the drive beams 33 elastically deformable in the x-axis direction and also to the oscillator 31 through the sensor beams 34 elastically deformable in the y-axis direction so that the oscillator may be movable both in the x- and y-axis directions.

The second silicon substrate 12 also has comb-like drive electrodes 40 formed outside the strips 32 and inside side edges of the opening 14. Each of the drive electrodes 40 extends substantially parallel to a corresponding one of the strips 32 and has teeth 41 a each of which extends between adjacent two of teeth 35 arrayed on a side of the strip 32. The drive electrodes 40 each lead to aluminum-made pads 41 coupled electrically to an external control circuit (not shown) by wire bonds. When a drive signal is applied to the drive electrodes 40 through the pads 41, it will cause the whole of the mass portion 30 to oscillate in the x-axis direction.

The second silicon substrate 12 also has sensor electrodes 50 formed outside the oscillator 31 and inside ends of the opening 14 in the y-axis direction. Each of the sensor electrodes 50, like the drive electrodes 40, has teeth each of which extends between adjacent two of teeth 36 formed on one of C-shaped end portions of the oscillator 31. The sensor electrodes 50 each lead to aluminum-made pads 51 coupled electrically to the above described external control circuit by wire bonds. When the oscillator 31 is moved or rotated at an angular velocity $\Omega$, as illustrated in a right lower corner of FIG. 2, around a direction perpendicular to both the x- and y-axis directions (will be referred to as a z-axis direction below) during oscillation (will be referred to as self-excited oscillation below) produced by application of the drive signal in the x-axis direction, it will cause the oscillator 31 to move or oscillate in the y-axis direction. The sensor electrodes 50 detect the oscillations of the oscillator 31 in the y-axis direction through the teeth 36 formed on the oscillator 31 for determining the angular velocity $\Omega$.

The second silicon substrate 12 also has monitor electrodes 60 formed outside ends of the strips 32 extending inside the opening 14. Each of the monitor electrodes 60 has teeth meshing with teeth 37 extending outward from an outer side of a corresponding one of the strips 37. The monitor electrodes 60 each lead to aluminum-made pads 61 coupled electrically to the above described external control circuit by wire bonds and work to monitor oscillations of the mass portion 30 including the oscillator 31 in the x-axis direction to produce a monitor signal.

The base portion 20, the mass portion 30, the drive electrodes 40, the sensor electrodes 50, and the monitor electrodes 60 are isolated electrically from each other by the above described grooves etched in the second silicon substrate 12.

The operation of the angular rate sensor unit 1 will be described below.

The external control circuit provides drive signals to the drive electrodes 40 in the form of a sine wave voltage through the pads 41 to produce electrostatic forces between the drive electrodes 40 and the teeth 35 of the strips 32. The production of the electrostatic forces will cause the whole of the mass portion 30 (including the oscillator 31) to oscillate in the x-axis direction by elasticity of the C-shaped drive beams 33. The oscillation of the mass portion 30 will result in a change in capacity between the teeth of each of the monitor electrodes 60 and the teeth 37 of the oscillator 31. The monitor electrodes 60, thus, produce and output monitor signals indicative of such a change to the external control circuit. The external control circuit produces the drive signals to be applied to the drive electrodes 40 as a function of the monitor signals inputted thereto in feedback control.

When the angular rate sensor unit 1 (i.e., the mass portion 30) is moved or rotated at the angular velocity $\Omega$ around the z-axis direction during the self-excited oscillation, it will cause the Coriolis force to be produced and applied to the mass portion 30 in the y-axis direction, so that the oscillator 31 oscillates in the y-axis direction through elasticity of the sensor beams 34. These oscillations will result in a change in capacity between the teeth of each of the sensor electrodes 50 and the teeth 36 of the oscillator 31. The sensor electrodes 50, thus, produce and output sensor signals indicative of the degree of such a change to the external control circuit. The external control circuit determines the angular velocity $\Omega$ as a function of the sensor signals inputted thereto.

For instance, when the oscillator 31 is moved in one of opposite directions along the y-axis in FIG. 2, it will cause changes in capacity which are oriented in opposite directions to be produced in upper and lower angular velocity sensing mechanisms, as viewed in the drawing, each consisting of the teeth 36 of the oscillator 31 and the sensor electrode 50. The determination of the angular velocity Ω is, therefore, achieved by converting the changes in capacity produced in the upper and lower angular velocity sensing mechanisms into voltage signals and amplifying a voltage difference therebetween through, for example, a differential amplifier.

If a resonant frequency of oscillations of the oscillator 31 in the x-axis direction (will also be referred to as a self-excited oscillation resonant frequency below) is defined as fd, and a resonant frequency of oscillations of the oscillator 31 in the y-axis direction (will also be referred to as an input angular velocity-caused oscillation resonant frequency below) is defined as fs, the angular rate sensor unit 1 is so designed as to set the input angular velocity-caused oscillation resonant frequency fs higher than the self-excited oscillation resonant frequency fd in order to ensure desired frequency characteristics of the angular velocity. The sensor signals as produced by the angular velocity sensing mechanisms are processed by a synchronous detector operating in synchronism with the self-excited oscillation resonant frequency fd to extract a frequency component therefrom which is identical with the self-excited oscillation resonant frequency fd.

If the angular rate sensor unit 1 undergoes the angular velocity Ω at a rotational frequency of f0 during oscillation of the oscillator 1 at a speed v and at the self-excited oscillation resonant frequency fd in the x-axis direction, a resultant oscillation velocity acting on the oscillator 31 (will be referred to as an angular velocity output Vs below) will be, as expressed in equations below, proportional to the Coriolis force Fc.

$$Vs \propto Fc = 2mv\Omega \quad (1)$$

where m is the mass of the oscillator 31.

$$v = V0 \cdot \sin(2\pi \cdot fd \cdot t) \quad (2)$$

$$\Omega = \Omega 0 \cdot \sin(2\pi \cdot f0 \cdot t) \quad (3)$$

where V0 is the amplitude of the oscillations of the oscillator 31 at the frequency fd, and Ω is the angular velocity applied to the oscillator 31 at the frequency f/O.

By substituting Eqs. (2) and (3) into Eq. (1) and expanding it, we obtain $$Vs \propto 2mV0 \cdot 0 \cdot \sin(2\pi \cdot fd \cdot t) \cdot \sin(2\pi \cdot f0 \cdot t) = 2mV0\ \Omega 0 \cdot \{\sin 2\pi(fd+f0)t + \sin 2\pi(fd-f0)t\} \quad (4)$$

From Eq. (4), it is found that when the oscillator 31 undergoes angular motion at the angular velocity Ω and the frequency f0 during the self-excited oscillation at the speed v and at the self-excited oscillation resonant frequency fd, the sum of Coriolis forces of frequencies (fd+f0) and (fd−f0) is added to the oscillator 31.

Figure 4:
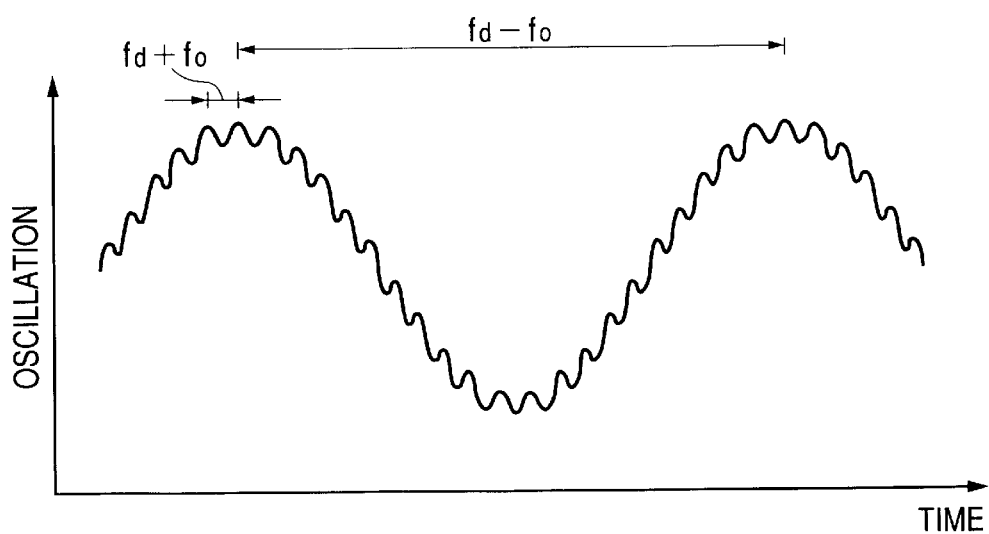
FIG. 4 is a graph which shows oscillation of an oscillator subjected to angular velocity.

FIG. 4 illustrates oscillations of the oscillator 31 in the y-axis direction arising from application of the sum of Coriolis forces of frequencies (fd+f0) and (fd−f0). Note that when the frequency f0 of oscillations at the angular velocity Ω is equal to a difference Δf between the self-excited oscillation resonant frequency fd and the input angular velocity-caused oscillation resonant frequency fs, the angular velocity output Vs is set to have a maximum value.

Additionally, when the angular rate sensor unit 1 undergoes an acceleration of a frequency f0' in the y-axis direction during oscillations of the oscillator 31 at the speed v and at the self-excited oscillation resonant frequency fd in the x-axis direction, the oscillator 31 also produces the angular velocity output Vs according to Eqs. (1) to (4), as described above. Specifically, when the angular rate sensor unit 1 experiences accelerated motion at the frequency f0' in the y-axis direction, it oscillates in the y-axis direction, thereby causing the sum of Coriolis forces of frequencies (fd+f0') and (fd−f0') to be applied to the angular rate sensor unit 1. If f0'=fs−fd, that is, if the frequency f0' of the accelerated motion of the oscillator 31 is equal to the above described oscillator resonant frequency difference Δf, the Coriolis force of the input angular oscillation resonant frequency fs is applied to the oscillator 31, so that the oscillator 31 undergoes a great oscillation, which results in addition of an undesirable noise to the angular velocity output Vs.

In order to eliminate such a noise, the angular rate sensor unit 1, thus, needs to be designed to have a resonant frequency fa (will also be referred to as a sensor unit resonant frequency below) in the y-axis direction which works to minimize oscillations of the oscillator 31 arising from the accelerated motion of the angular rate sensor unit 1 in the case of f0'=fs−fd. In this embodiment, the sensor unit resonant frequency fa is set lower than or equal to a reciprocal of square root of two times the oscillator resonant frequency difference, Δf (i.e., ½$^{1/2}$×Δf). The reason for this will be discussed below with reference to FIG. 5.

Figure 5:
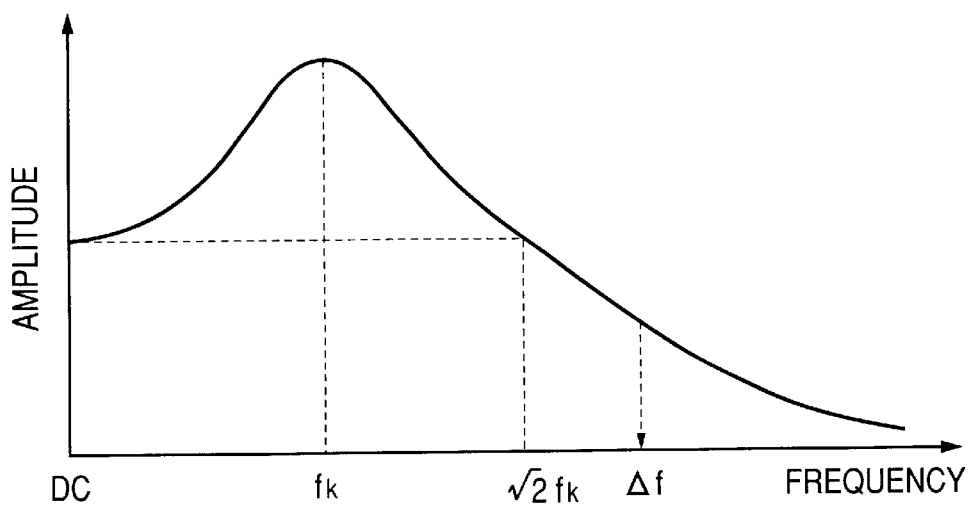
FIG. 5 is a graph which shows a typical relation between oscillatory movement of a physical structure and frequency of voltage applied thereto.

FIG. 5 shows a typical oscillation-to-frequency relation of a physical structure when subjected to physical vibrations produced by application of the voltage to the structure. "DC" in the drawing indicates when the voltage of zero frequency is applied to the structure, that is, a dc voltage is used to bias the structure to one direction. When the frequency of the voltage applied to the structure is increased gradually from zero, the displacement of the structure (i.e., an amplitude of oscillation of the structure) is maximized at a resonant frequency fk. After fk, the oscillation of the structure attenuates.

When the frequency of the voltage, that is, the frequency of oscillation of the structure is increased up to 2½ times the resonant frequency fk of the structure, the oscillation of the structure is damped down to have an amplitude equivalent to the displacement of the structure when the frequency is zero, that is, when the dc voltage is applied to the structure. When the frequency of the oscillation of the structure is further increased, it will cause the amplitude of oscillation of the structure to be decreased bellow the displacement of the structure when the frequency of zero.

It is, therefore, found that increasing the frequency of oscillation of the structure above the 2½ times the resonant frequency fk of the structure causes the amplitude thereof to be lowered below the displacement of the structure when applied with the dc voltage. Specifically, in this embodiment, if the frequency f0' of oscillation of the angular rate sensor unit 1 when undergoing the accelerated motion= the oscillator resonant frequency difference Δf, the attenuation of the oscillation of the oscillator 31 arising from the accelerated motion of the angular rate sensor unit 1 may be achieved by setting Δf higher than or equal to 2½ times the resonant frequency fa of the angular rate sensor unit 1 (i.e., a structure made up at least of the sensor chip 100 and the mount base 200).

Conversely, the oscillation of the angular rate sensor unit 1 in the y-axis direction produced when the whole of the angular rate sensor unit 1 undergoes acceleration at a frequency identical with the oscillator resonant frequency difference Δf in the y-axis direction may be damped greatly by setting the sensor unit resonant frequency fa lower than or equal to a reciprocal of square root of two times the oscillator resonant frequency difference Δf (i.e., ½$^{1/2}$×Δf). This results in greatly attenuation of oscillation of the oscillator 31 itself in the y-axis direction arising from the accelerated motion of the sensor unit 1 in the y-axis direction.

It is also apparent from FIG. 5 that the oscillation of the oscillator 31 produced when the angular rate sensor unit 1 experiences acceleration at a frequency fd, fs, or fd+fs that is higher than the oscillator resonant frequency difference Δf=fs−fd is attenuated greatly.

The sensor unit resonant frequency fa (i.e., the resonant frequency of the sensor unit 1 in the y-axis direction) is expressed by $$fa = 1/\{2\pi \cdot (k/M)^{1/2}\} \quad (5)$$

where k is the spring constant of the adhesive layer 300 in the y-axis direction, and M is the mass of the sensor chip 100.

The spring constant k is proportional to the Young's modulus of the adhesive layer 300. Setting the sensor unit resonant frequency fa to a value that is less than or equal to a reciprocal of square root of two times the oscillator resonant frequency difference Δf (i.e., ½$^{1/2}$×Δf) is, thus, achieved easily by increasing the weight of the sensor chip 100, decreasing the Young's modulus of the adhesive layer 300, or increasing the thickness of the adhesive layer 300 to decrease the spring constant of the adhesive layer 300.

The sensor unit resonant frequency fa is also set higher than a cut-off frequency (e.g., 100 Hz) in angular motion response of the sensor chip 100.

Generally, an oscillatory angular rate sensor of a type, as discussed herein, is required to have an oscillator which moves following angular motion of the sensor without resonating when the sensor is rotated gently, that is, when the angular velocity of the sensor is smaller in frequency than a given lower frequency. The oscillator of the sensor is, thus, designed not to resonate when the sensor undergoes angular motion at a velocity smaller than the given lower frequency (i.e., the cut-off frequency). The oscillator 31 of the sensor chip 100 in this embodiment is designed not to resonate when the angular velocity is less than approximately 100 Hz. This is achieved by, for example, selecting the shape and/or thickness of the drive beams 33 and sensor beams 34.

For example, if the self-excited oscillation resonant frequency fd is 4000 Hz, the input angular oscillation resonant frequency fs is 4400 Hz, the oscillator resonant frequency difference Δf of the oscillator 31 is 400 Hz, and the cut-off frequency fc is 100 Hz, the sensor unit resonant frequency fa is set to 100 to 282 Hz. This is accomplished by setting the Young's modulus of the adhesive layer 300 to 2000 to 4900 Pa in a case where the thickness of the adhesive layer 300 is 170 μm.

Figure 8:
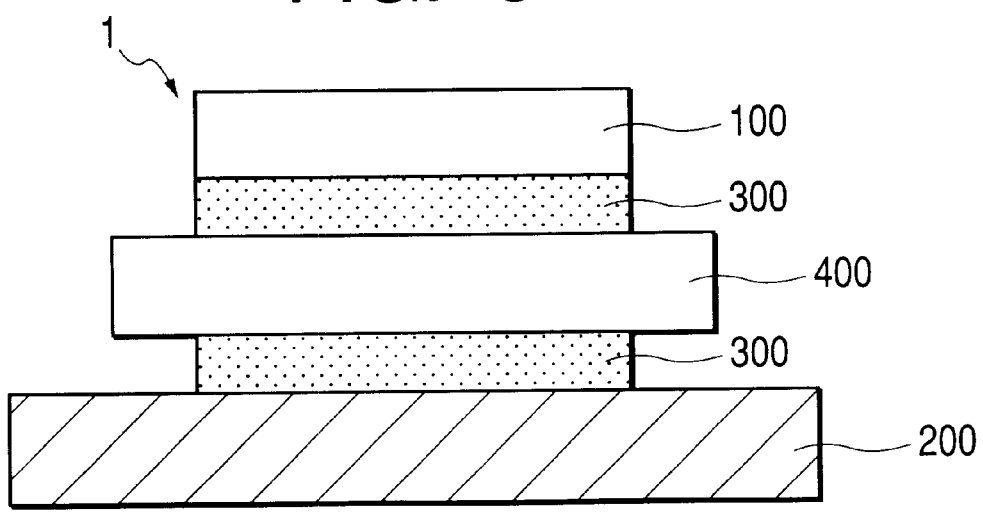
FIGS. 6, 7, and 8 are transverse sectional views which illustrate modifications of the angular rate sensor unit of FIG. 1.
Figure 6:
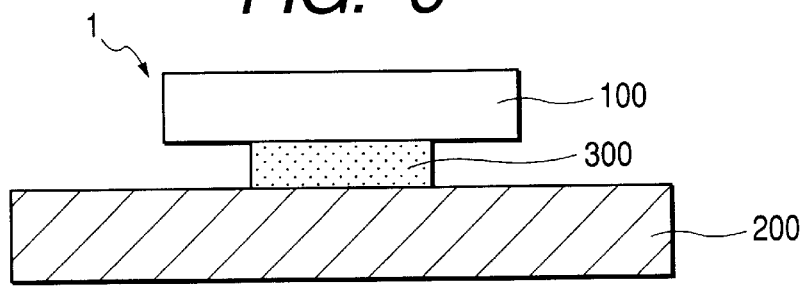
Figure 7:
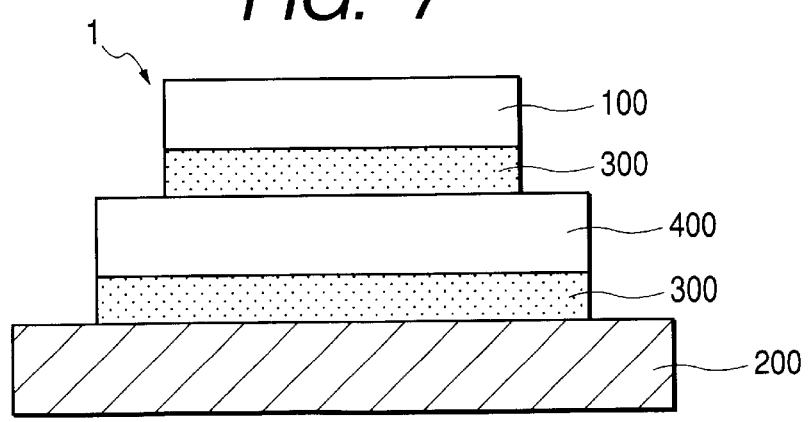

FIGS. 6 to 8 illustrate modification of the angular rate sensor unit 1.

In FIG. 6, the sensor chip 1 is installed at a portion of the bottom thereof on the mount base 200 through the adhesive layer 300. This structure provides the spring constant to the adhesive layer 300 which is smaller than when the entire bottom surface of the sensor chip 1 is attached to the mount base 200 through the adhesive layer 300.

In FIG. 7, a circuit chip 400 is installed on the mount base 200 through the adhesive layer 300. The circuit chip 400 works to provide the drive signals to the electrodes 40 to induce the self-excited oscillation of the oscillator 31, convert a change in capacity of the sensor chip 100 produced as a function of the angular velocity applied to the sensor chip 100 into a voltage signal, and process the voltage signal through a synchronous detector to provide a sensor output. On the circuit chip 400, the sensor chip 100 is installed through the second adhesive layer 300.

The sensor unit 1, as illustrated in FIG. 8, is a combination of the ones of FIGS. 6 and 7. Specifically, the circuit chip 400 is installed at a portion of the bottom thereof on the mount base 200 through the adhesive layer 300. This, like the first modification of FIG. 6, results in a decrease in spring constant of the adhesive layer 300.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For instance, the drive electrodes 40 and the sensor electrodes 50 may alternatively be designed to work as the oscillation exciting mechanism and the angular velocity sensing mechanism, respectively, by changing intervals between the teeth 36 and teeth of the drive electrodes 40 and between the teeth 35 and teeth of the sensor electrodes 50. In this case, the oscillator 31 is driven by the electrodes 50 in the y-axis direction so that it oscillates in the x-axis direction in sensing the angular velocity of the sensor unit 1. The drive beams 33 and the sensor beams 34 also work in a relation reverse to that in the above embodiment.

What is claimed is:

1. An angular rate sensor unit comprising:

a mount base; and a sensor element installed on said mount base, said sensor element including a substrate, an oscillator, an oscillation exciting mechanism, and an angular velocity sensing mechanism, the oscillator being retained by the substrate through a first support member elastically deformable in a first direction and a second support member elastically deformable in a second direction perpendicular to the first direction, the oscillation exciting mechanism working to excite the oscillator to oscillate in the first direction, the angular velocity sensing mechanism working to produce a sensor output as a function of degree of oscillation of the oscillator in the second direction arising from angular motion the oscillator experiences about an axis extending in a third direction perpendicular to the first and second directions during oscillation of the oscillator in the first direction, wherein a resonant frequency of a structure made up of said mount base and said sensor element in the second direction is set to a value less than or equal to a reciprocal of square root of two times a difference between a resonant frequency of the oscillator in the first direction and a resonant frequency of the oscillator in the second direction.

2. An angular rate sensor as set forth in claim 1, wherein the resonant frequency of the structure in the second direction is higher than or equal to a cut-off frequency in angular motion response of said sensor element.

* * * * *